Sept. 22, 1964 C. R. CANTONWINE 3,150,306
MULTIPLE WINDING INDUCTION MOTOR WITH VARIOUS
WINDING DISTRIBUTION FACTORS
Filed March 2, 1962 2 Sheets-Sheet 1

INVENTOR
Charles R. Cantonwine

INVENTOR
Charles R. Cantonwine

United States Patent Office 3,150,306
Patented Sept. 22, 1964

3,150,306
MULTIPLE WINDING INDUCTION MOTOR WITH VARIOUS WINDING DISTRIBUTION FACTORS
Charles R. Cantonwine, 950 Airport Road, Hot Springs, Ark.
Filed Mar. 2, 1962, Ser. No. 176,983
4 Claims. (Cl. 318—220)

This invention relates to motors in general and more particularly to improved means for starting and running alternating current (hereinafter abbreviated A.C.) motors which enables such motors to have reduced starting current without requiring separate impedance devices for starting purposes and without loss of starting torque and furthermore having increased output, by utilizing all of the windings, including the starting winding, to form a full composite running winding.

In my co-pending Patent Application Serial No. 661,634, now Patent No. 3,031,606, filed May 27, 1957, of which this application is a continuation-in-part, there is shown and described a motor that uses all of the windings for starting and running.

In my co-pending patent application Serial No. 765,238, now Patent No. 3,068,389, filed October 3, 1958, of which this application is a continuation-in-part, there is shown and described a motor that is self-starting without requiring separate impedance devices or high resistance starting windings and utilizes all of the windings during the starting and running condition.

In the past, it has been the practice to provide A.C. split phase motors with a high resistance and low inductance starting winding and a running winding of high inductance and low resistance in order to provide means for shifting the phase of the starting current to provide starting torque. Due to the small angle of phase shift that is produced during starting in the known constructions, the total locked rotor current is almost the numerical sum of the current flowing through the main and starting windings. This means that a relatively high starting current is required and this in turn limited the use of split-phase motors to the lower ratings in the fractional horsepower range and forced the use of more costly motor constructions in the larger sizes for light and middle starting torque applications. It has also been the practice to provide A.C. motors with separate starting and running windings. Once these motors reached a predetermined speed, the starting winding was disconnected from the circuit or otherwise made ineffective and became deadweight at running speed.

The present invention overcomes these objectionable features of known split-phase motors by providing a relatively simple motor construction having a starting torque that equals or exceeds that provided by known split-phase motors, and this is accomplished with even less starting current, and furthermore the motor uses all of the windings for running and starting, thereby increasing the output and efficiency of the motor.

It is therefore a principal object of this invention to provide an A.C. motor having low starting current without requiring the use of impedance devices and without reducing the capacity and efficiency of the motor.

Another object is to increase the efficiency of A.C. motors by employing all of the windings thereof during starting and running.

Another object is to employ transformer action between windings of an A.C. motor to produce phase shift and starting torque.

Another object is to provide an A.C. motor capable of producing an output limited only by the operating conditions of the motor and not by conditions imposed thereon by the starting requirements.

Another object is to reduce magnetic vibration and noise in A.C. motors especially during starting.

Another object is to provide an A.C. motor capable of withstanding sustained and frequent starting periods.

Another object is to increase the starting and running output and efficiency of A.C. resistance split-phase motors.

Another object is to reduce the cost of A.C. motors without reducing the horsepower output thereof.

Another object is to provide means for reducing the starting current and increasing the output in A.C. motors which means can be installed as original equipment or added as an improvement on existing motors.

Another object is to prolong the life and reduce the maintenance costs associated with A.C. motors.

Another object is to provide an A.C. motor in which the starting current need not substantially exceed the current in the main winding of a single phase induction motor.

Still another object is to provide a self starting A.C. motor that does not require separate impedance or phase shifting devices, shorted or shaded windings, high resistance windings or commutators and brushes.

These and other objects and advantages of the present invention will become apparent after considering this specification in conjunction with the accompanying drawings.

Figure 1:
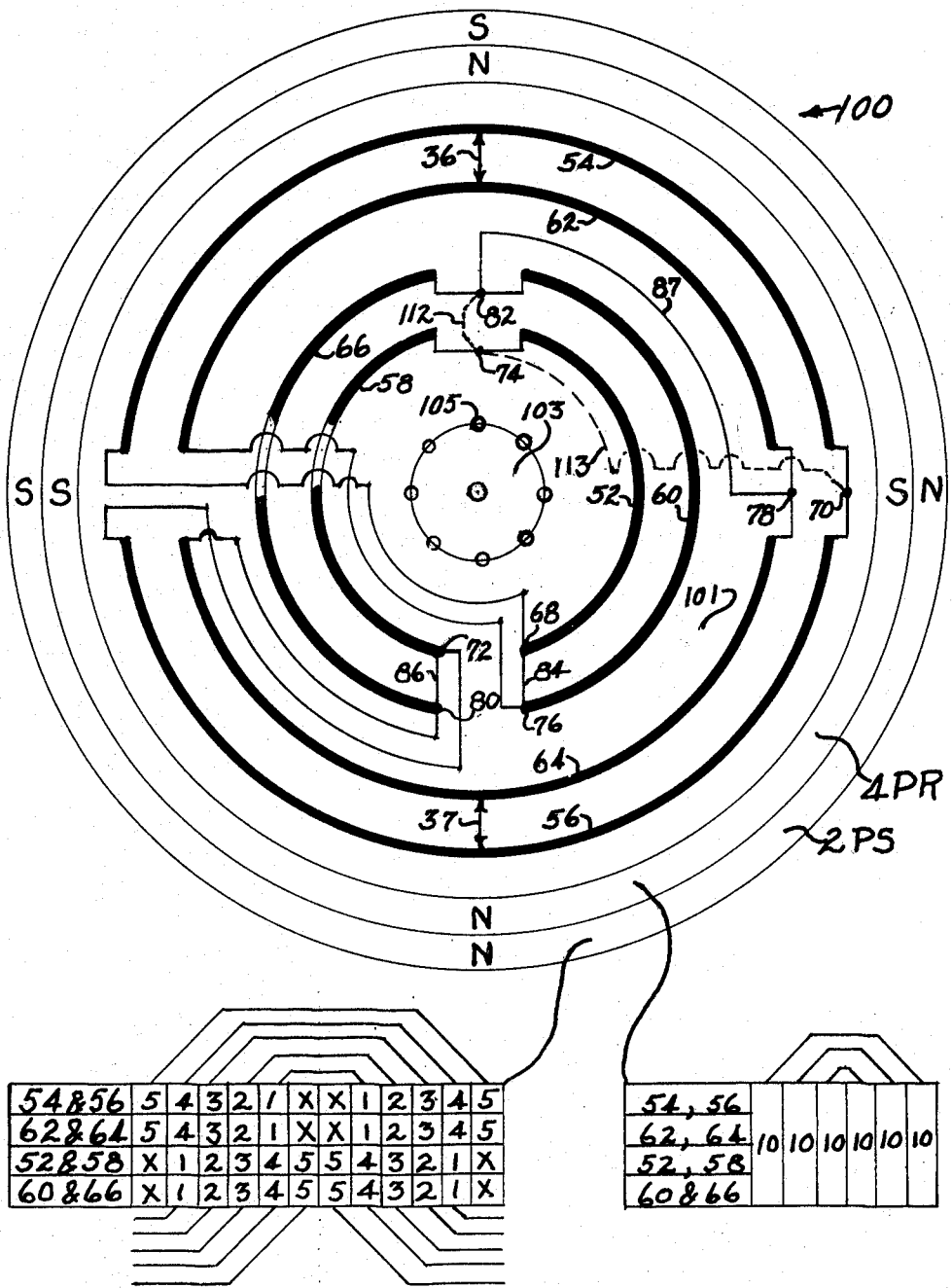
FIG. 1 is a schematic lay-out drawing showing a motor embodying the teachings of the present invention.

Referring to the drawings by reference numbers, the number 100 in FIG. 1 refers to a motor which has a stator 101 and a rotor 103. The stator 101 has four pairs, or two sets of four, symmetrically positioned windings designated 54 and 62 as one pair, 56 and 64 as a second pair, 60 and 52 as a third pair, and 66 and 58 as a fourth pair. One set of four windings consists of windings 54, 56, 58, and 52, and the other set of the two sets of four windings consists of windings 62, 64, 66, and 60, and the rotor has a winding designated 105.

The stator windings pair 54 and 62, and pair 56 and 64 are opposite each other on stator 101 (FIG. 1), and are illustrated as being physically located further out from the rotor 103 than windings pair 60 and 52, and pair 66 and 58, but this is not necessarily limited and the relationship can be reversed. Windings pair 60 and 52, and pair 66 and 58 are also opposite each other and are offset 90 electrical degrees, but can be at other angles, from the winding pair 54 and 62, and pair 56 and 64. Each of the pairs 54–62, 56–64, 60–52, and 66–58 comprise one pole winding group for a two pole motor, however, for other numbers of poles each pair can comprise two or more pole winding groups. Each pair forming a pole winding group in any one of several combinations such as, concentric, overlap, in the same slots, in different slots, on the same axis, on a different axis, or any other known method.

Winding 54 is connected to winding 56 at terminal 70, winding 56 is connected to winding 58 at terminal 72, winding 58 is connected to winding 52 at terminal 74, winding 52 is connected to winding 54 at terminal 68. Likewise winding 62 is connected to winding 64 at terminal 78, winding 64 is connected to winding 66 at terminal 80, winding 66 is connected to winding 60 at terminal 82, and winding 60 is connected to winding 62 at terminal 76. Terminal 76 is connected by jumper 84 to terminal 68. Terminal 72 is connected by jumper 86 to terminal 80. Terminal 78 is connected by jumper 87 to terminal 82. Terminal 74 is connected by jumper 112 to terminal 82 for certain conditions, and terminal 70 is connected by jumper 113 to terminal 74 for certain conditions. Therefore the windings 54, 56, 58 and 52 are permanently connected together in series to form a first closed loop circuit, and likewise windings 62, 64, 66, and 60 are permanently connected together in series to form a second closed loop circuit. The first closed loop circuit will therefore have four junctions 70, 72, 74, and 68, positioned between the windings, and the second closed loop circuit will have four junctions, 78, 80, 82, and 76 positioned between the windings. The first and second closed loop circuits are permanently connected together by jumper 86 at junctions 72 and 80, and permanently connected together by jumper 84 at junctions 76 and 68. Jumper 112, shown in dotted lines, can be connected between junctions 74 and 82, and jumper 113 can be connected, as shown in dotted lines, between junctions 74 and 70, each of the jumpers 112 and 113 serve a very useful purpose for certain conditions and will be more fully explained hereinafter.

In FIG. 1 the coil span of each pole winding group is shown as having less than 180 degrees span, however, it is not limited to this arrangement, as the coil span can be any angle from, less than 90 degrees to over 180 degrees, also the winding pairs are shown on the same axis, but it is not limited to this arrangement, as one winding can be offset by a small angle relative to the other one of a pair.

In FIG. 1 is shown an adjustable jumper 36 connected between windings 54 and 62, and another adjustable jumper 37 connected between winding 64 and 56, the purposes of which will be explained hereinafter.

In FIG. 1 the outer circle of polarities N (north) and S (south) designated 2PS (2 pole start) designates the polarities of the windings under the 2 pole starting conditions. The inner circle of polarities designated 4PR (4 pole run) designates the polarities of the windings under the 4 pole running condition.

In FIG. 1 the suggested 24 slot winding distribution chart designated 2PS is to the lower left of the motor 100 schematic lay-out, and the resulting or consequent, distribution chart designated 4PR is to the lower right of motor 100 schematic lay-out. The 2 pole start distribution chart shows a favorable two pole winding distribution to provide approximately the same, or lower, flux density under the 2 pole starting condition as is realized under the 4 pole running condition. Usually the flux density ratio is about 1.414 to 1 when regrouping the windings, having the same number of coils and the same number of conductors per coil, from a 2 pole to a 4 pole connection, or stated inversely, the flux density ratio is about 1 to the square root of 2, when regrouping from a 4 pole connection to a 2 pole connection, if the winding has the same number of coils and the same number of turns per coil. However, some of the objects of this invention can best be obtained when the flux density is in the ratio of approximately the square root of 2, to 1 and other objects of this invention can best be obtained when the flux density is in the ratio nearer 1 to 1, or even less, as will be explained hereinafter.

The two distribution charts in FIG. 1 show how this ratio can be adjusted by changing the distribution of the windings, and is not limited to this example, but can be altered to suit the requirements. The numbers 54, 56, 62, 64, 52, 58, 60, and 66 designate the windings, and the numbers 1–5 and 10 designate the number of turns when multiplied by a constant factor, such as 10. The distribution charts illustrate an example only and can have the pair of windings in a given pole winding group arranged to provide a different axis for each of the windings of a pair.

Figure 2:
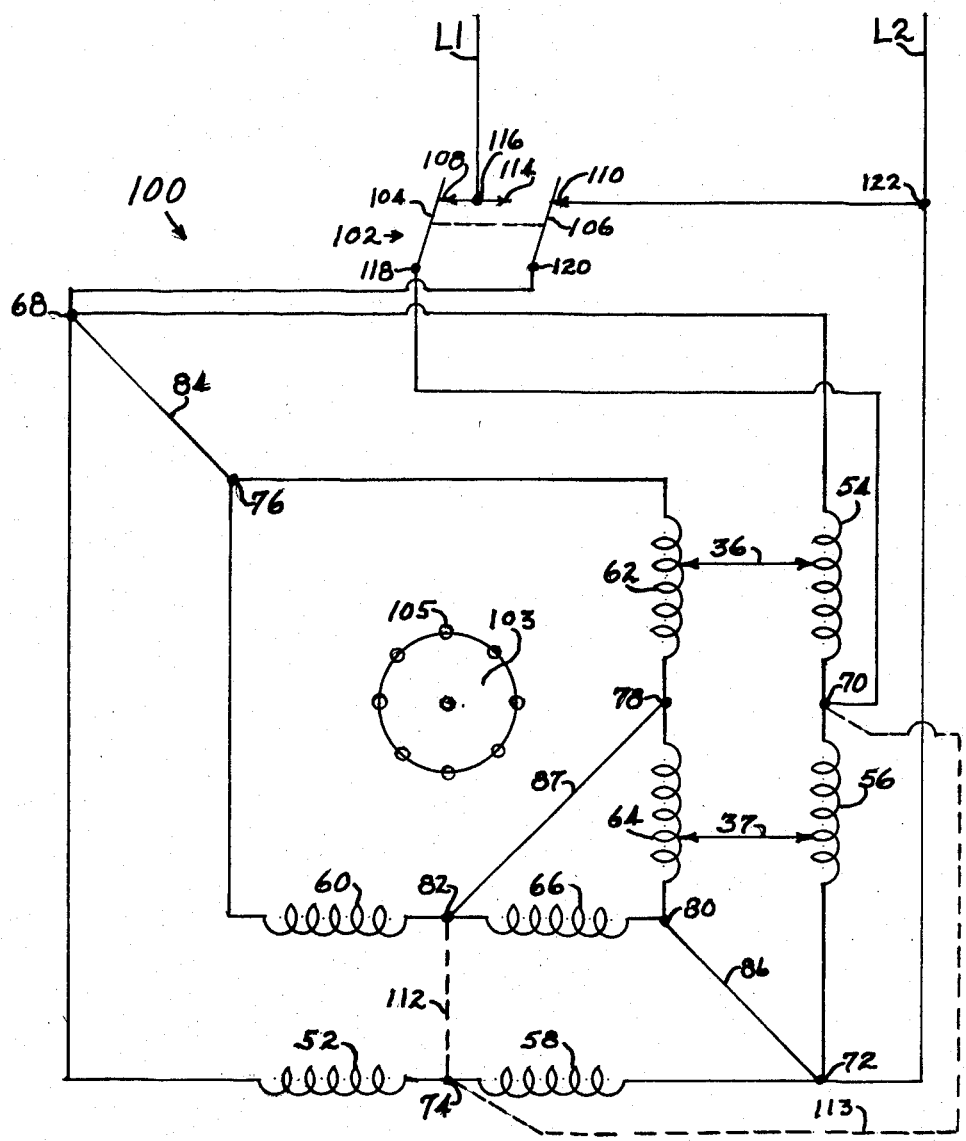
FIG. 2 is a schematic wiring diagram of the electrical circuit for the motor shown in FIG. 1.

FIG. 2 shows the schematic wiring diagram of motor 100, FIG. 1, and is shown in the 2 pole starting condition. FIG. 2 shows the electrical connections of a switching device 102 between an A.C. source of energy supplied to line leads L1 and L2, and to the junctions 70, 72, and 68 of motor 100 of FIG. 1. Lead L1 is connected to junction 116 which is common to stationary contacts 108 and 114 located on switching device 102. Normally open contact 114 engages with switch blade 106 in its transfer position, normally closed stationary contact 108 engages switch blade 104, which is ganged to act in unison with switch blade 106, switch blade 104 is connected through terminal 118 to one end of windings 54 and 56 at junction 70, the other end of winding 54 is connected to junction 68, through terminal 120, to switch blade 106, and normally closed stationary contact 110, to junction 122 and line lead L2. Another circuit from junction 70 is through winding 56, the other end of which is connected to junction 72, through junction 122 and line lead L2. This connects windings 54 and 56 in parallel across line leads L1 and L2 and will hereinafter be referred to as the two primary winding sections of the main winding portion. Winding 54 and winding 62 are mutually inductively coupled to each other and likewise windings 56 and winding 64 are mutually inductively coupled to each other. Since primary windings 54 and 56 are energized by said A.C. source there will be a voltage induced in windings 62 and 64 respectively, by transformer action therebetween. Windings 62 and 64 will hereinafter be referred to as the two secondary winding sections of the main winding portion. Windings 62 and 64 are connected in parallel, being connected at one end by junction 78 and at the other end by a circuit from the other end of winding 64 to junction 80, jumper 86, junction 72, junction 122, contact 110, switch blade 106, terminal 120, junction 68, jumper 84, junction 76 and to the other end of winding 62. Starting winding 66 is connected across secondary winding section 64 at junction 80 and by jumper 87 at junctions 78 and 82, starting winding 60 is connected across secondary winding 62 at junction 76 and by jumper 87 at junctions 78 and 82. Therefore the voltage induced in the two secondary winding sections 62 and 64 is impressed across the two starting winding sections 60 and 66 respectively. The current flowing in the starting windings 60 and 66 is out of phase with the current flowing in the primary winding sections 54 and 56 due to transformer action and leakage reactance between the primary sections 54 and 56, and the secondary sections 62 and 64 and therefore a substantial starting torque is developed. If jumper 112 is connected then the starting winding sections 66 and 58 will be in parallel and could be replaced by an equivalent single winding, also starting winding sections 60 and 52 will be in parallel and could be replaced by an equivalent single winding.

The adjustable jumper 36 connected between primary winding section 54 and secondary winding section 62, as well as the adjustable jumper 37 connected between the primary winding section 56 and the secondary winding section 64, effectively connects a portion of each primary section in parallel with a portion of each corresponding secondary section to provide a means of predetermining the amount of leakage reactance and the amount of power transmitted to the starting winding sections and hence, starting torque and current. Due to the presence of leakage reactance and the loading of the secondary sections by the starting winding sections there will be substantial current flowing through jumpers 36 and 37 under starting conditions because the secondary voltage can drop to as low as one fourth, or lower, of the primary or line voltage during the starting condition.

The jumper 113 is connected between junctions 70 and 74 when it is elected to provide an additional phase shifting means. One means is provided by leakage reactance and transformer action with windings 54 and 56 acting as a primary, windings 62 and 64 acting as a secondary, and windings 60 and 66 acting as the starting winding. Another means of phase shifting is provided by resistance split-phase action with windings 54 and 56 acting as the main winding and windings 52 and 58 acting as the starting winding, being adapted to have the current out of phase with the current in the main winding by having a relatively high resistance and being connected across the line by jumper 113, for this split-phase connection it is preferable to eliminate jumper 112 and provide windings 52 and 58 with a resistance value that is higher than the resistance of main windings 54 and 56, and also to give a higher torque developed from leakage reactance, and also to provide a balanced full running winding, it is preferable to have windings 60 and 66 of lower resistance than windings 52 and 58. If only the resistance split phase connection is desired, and still obtain full running output, then with jumper 113 connected between junctions 70 and 74, jumper 87 between junction 78 and 82 can be eliminated and jumper 36 and 37 connected across junctions 70 and 78 and eliminate jumper 112. Combinations of any or all of the aforesaid connections are possible and are anticipated to be within the scope of this invention.

The motor 100, FIG. 2, starts as a 2 pole motor and at a predetermined speed switching device 102 is moved to the transfer or running position with switch blade 104 disengaged from contact 108, and simultaneously switch blade 106 disengages contact 110 and engages contact 114. Now the motor is connected to operate as a 4 pole motor in the running condition with line lead L1 connected through junction 116 to contact 114, switch blade 106, terminal 120 and to junction 68 through four series parallel circuits back through junction 72, junction 122 and line lead L2, a first series circuit is from junction 68 through winding 54, junction 70, winding 56, junction 72, junction 122 and lead L2, a second series circuit is from junction 68 through jumper 84 to junction 76, winding 62, junction 78, winding 64, junction 80, through jumper 86 to junction 72, junction 122 and lead L2, a third series circuit is from junction 68 through jumper 84 to junction 76, winding 60, junction 82, winding 66, junction 80 through jumper 86 to junction 72, junction 122 and lead L2, a fourth series circuit is from junction 68 through winding 52, junction 74, winding 58, junction 72, junction 122 and to lead L2. All of the primary sections, secondary sections and starting winding sections are therefore connected in a series parallel arrangement across the A.C. source to provide a full composite running winding. The main and starting windings are in space quadrature but magnetically in phase as shown by the polarities designated 4PR. Junctions 78, 82, 74, and 70 are all at the same potential in the running condition, assuming that each of the series connected windings are equal, and therefore there will be no current flowing through jumper 87, 112 and 113, if used, and likewise there will be no current flowing through jumpers 36 and 37, if used, as it is desirable to connect these jumpers at preselected locations on the primary and secondary sections so as to be at points of equipotential during the running connection, however there will be a substantial current flowing through jumpers 36 and 37 during the starting connection. However it should be noted that it is not necessary to have jumpers 36 and 37 at the same relative potential, nor is it necessary that both jumpers 36 and 37 be employed, either one or both, or neither can be used. Jumpers 36 and 37 can be permanently connected or connect together pre-tapped windings by switching or other means.

When switching device 102 is moved to a position having the switch blades 104 and 106 intermediate to and disengaging contacts 108, and 110 and 114 respectively, the current through line lead L1 is interrupted and the motor is de-energized or in the "off" position.

Switching device 102, FIG. 2, can be of the mechanical governor type of speed responsive switch actuating the movable switch blades 104 and 106, to be in a starting position, as shown, at speeds below a predetermined speed, and in a running position at speeds above a predetermined speed, or said switching device can be of the relay type actuated by changes of motor speed as reflected in a change of current or voltage in any part of the motor circuit, or any suitable equivalent thereof, such as a manually operated device when preferred, for example, to operate motor 100 as a two speed motor. Switching device 102 is shown, for reasons of simplicity, to have two switch blades 104 and 106 and two stationary contacts, one of which is single pointed, contact 110, and the other of which is double pointed, contacts 108 and 114, however, this can be arranged to have a single pointed contact to replace 108 and 114 such as represented as junction 116 whereby the two switch blades, 104 and 106 would be arranged for wiping action, slideable over the two stationary contacts, or blades that traverse the two stationary contacts in any manner whatsoever.

Since motor 100 starts as a 2 pole motor and runs as a 4 pole motor, switching device 102 can be adjusted to changeover from a starting to a running position at speeds below, equal to, or above the 4 pole running speed, and therefore can be adapted to provide greater lock-in torque for synchronous motors by dropping into synchronism rather than pull-in to synchronism.

Good results were obtained by providing primary windings 54 and 56, secondary windings 62 and 64 and starting windings 66-58 and 60-52, with the same size wire and number of turns with jumper 112 connected and with jumper 36 embracing 75% of the turns from junction 76 and 68 and with jumper 37 embracing 75% of the turns from junctions 80 and 72, and with a distribution chart as shown in FIG. 1. However higher starting torque and current can be obtained by providing the primary windings 54 and 56 with heavier wire, but the same number of turns, as the secondary windings 62 and 64 in the ratio of about 2 to 1. The running output was at full capacity.

Good results were obtained by connecting the windings to start as a resistance split phase motor by connecting jumpers 36 and/or 37 across junctions 70 and 78 and by providing starting winding 66 and 60 with a finer wire than starting windings 58 and 52 in the ratio of about 1 to 2, and with jumpers 112 and 113 disconnected. The running output was at full capacity.

Good results were obtained by connecting the windings to start as a combination leakage reactance, and also split phase motor by using jumper 113, eliminating jumpers 112, 36, and 37, and providing windings 52 and 58 having a resistance approximately 4 times the resistance of windings 54 and 56, and windings 60 and 66 having lower resistance than windings 54 and 56. The running output was at full capacity.

The motor 100 of FIGS. 1 and 2 can be adapted to have a wide range of starting characteristics without materially affecting the full running capacity, or an even wider range of starting characteristics can be realized, at a sacrifice in various degrees of running characteristics. The starting and running characteristics as a 2 pole motor, and the running characteristics as a 4 pole motor, will depend, among other things, on the combination of the following design factors.

*Factor 1.*—The distribution of the windings will determine the flux density ratio between the starting and running conditions. If all of the windings have the same number of coils and the same number of turns per coil, this ratio will be approximately, the square root of 2, to 1. If the 4 pole running winding distribution factor is higher than the distribution factor of the 2 pole starting connection this ratio will be higher than, the square root of 2, to 1. If the distribution factor is higher for the two pole starting connection than for the 4 pole running connection, as shown in FIG. 1, then this ratio can be approximately 1 to 1 or even less.

*Factor 2.*—The degree of mutually inductive coupling between the primary winding sections 54-56 and secondary winding sections 62-64. This determines, among other things, the amount of leakage reactance to produce voltage drop and phase shift in the said starting winding sections, and power into the rotor. It is well known that, in a transformer, leakage reactance causes a voltage drop beyond the normal IR voltage drop in the secondary winding and also produces a phase shift between the primary and secondary voltages, but it has never been known to use this principle in electric motor construction to split the phase. This phase shift and voltage drop is dependent on the load imposed by the rotor winding and starting winding, therefore a low resistance starting winding can be employed.

*Factor 3.*—The leakage reactance caused by factor 2 plus the leakage reactance caused by the rotor winding loading the magnetic circuit.

Factor 4.—The position of adjustable jumpers 36 and 37. These jumpers can be positioned at any point on the corresponding windings from one extreme end to the other extreme end, or at any intermediate point therebetween. With jumper 36 connected across the extreme end of windings 54 and 62 at junctions 68 and 76, or eliminated entirely, and jumper 37 connected across the extreme end of windings 56 and 64 at junctions 72 and 80, or eliminated entirely, the transformer action and leakage reactance will offer the highest impedance to primary windings 54 and 56 with a minimum starting current and a good ratio of starting torque per ampere. As jumper 36 is moved away from junctions 68 and 76 and toward junctions 70 and 78 on windings 54 and 62 respectively, and also as jumper 37 is moved away from junctions 72 and 80 toward junctions 70 and 78 on windings 56 and 64 respectively, then the impedance of the primary winding sections 54 and 56 is reduced and the starting torque and current are increased proportionally, up to a point. If jumpers 36 and 37 are moved to the other extreme ends of windings 54–62 and 56–64, to junctions 70 and 78 respectively, then there is no transformer action and the primary winding sections and secondary winding sections are in parallel across the A.C. source and windings 54–62 as well as windings 56–64 could be replaced by equivalent single windings. However, without jumper 112 there is a high resistance starting winding circuit consisting of starting windings 66 and 60 in parallel with the primary and secondary sections so the motor will start as a conventional resistance split phase motor, but will have the advantage over conventional split phase motors because all of the windings will be used for running.

*Factor 5.*—The ratio of the starting winding resistance or conductor size. For maximum running capacity the current carrying capacity of the starting winding sections 60 and 66 plus the capacity of starting winding sections 52 and 58 should equal the total current carrying capacity of the primary winding sections 54 and 56 plus the current carrying capacity of secondary winding sections 62 and 64. Therefore starting winding sections 60 and 66 can have finer wire than starting winding sections 52 and 58, or inversely, providing the sum of the circular mils of the two starting winding sections equals the sum of the circular mils of the primary and secondary winding sections for maximum running output. By providing the starting winding sections 60 and 66, or 52 and 58, with finer wire the maximum starting torque can be developed as a resistance split phase motor, as explained under factor 4. For leakage reactance starting, the starting winding total impedance can be equal to or less than the total main winding impedance.

*Factor 6.*—The ratio of conductor size in the primary winding section and secondary winding section. With adjustable jumpers 36 and 37 positioned at intermediate points and jumper 112 connected, the motor will start as a leakage reactance split phase motor. Although good results have been obtained by providing primary winding sections 54 and 56 having the same number of turns and the same size wire as secondary winding sections 62 and 64, it has been found that better results can be obtained if the primary winding sections have larger wire than the secondary winding sections in approximately the ratio of 2 to 1. For maximum running output the sum of the circular mils in the primary and secondary sections should equal the sum of the circular mils in the combined starting winding sections.

*Factor 7.*—The use of jumper 112 can determine, within limits the resistance of the starting winding sections, whether the motor is connected to start as a leakage reactance split phase motor or as a resistance split phase motor without materially affecting the running characteristics. The use of jumper 113 can provide split phase means alone for starting, or in combination with leakage reactance means.

*Factor 8.*—The resistance of the rotor winding. It is well known that the effective resistance of the end rings of a given squirrel cage type rotor winding will have four times the resistance in a 2 pole field as it does in a 4 pole field. Since motor 100 starts as a two pole motor and runs as a four pole motor, the rotor winding can be designed for best running output as a 4 pole motor, and under starting conditions as a 2 pole motor the rotor resistance will be higher than normal. This results in higher power input to the rotor and hence higher starting torque and lower starting current.

*Factor 9.*—It is anticipated that external phase shifting impedance devices such as, capacitors, condensers, reactors, and resistors can be applied to this circuit in many ways such as, between junction 70 and 74 in place of jumper 113, to provide additional starting torque. Under running conditions these devices would be deactivated because junctions 70 and 74 for example, would be at points of equipotential.

*Factor 10.*—In combination with other factors, such as, factor 2, the degree of coupling can be varied and the angle of physical displacement between the main and starting windings can be altered from the usual 90 electrical degrees to provide better 2 pole (for example) running characteristics for two speed operation. The primary winding sections can be at a small angle relative to the secondary winding sections to aid in achieving the goal. This will provide a polar axis in one position during starting, and in combination with the displaced polar axis of the secondary provide a resultant polar axis of the main winding during running, as a 4 pole motor.

The motor 100 illustrates only two closed loop circuits however, there can be other closed loop circuits, either active or inactive during the starting connection, but connected to be active during the running connection. Also there can be only one closed loop circuit by connecting jumpers 36 and/or 37 across junctions 70 and 78 when windings 54 and 62 could be an equivalent single winding, and windings 56 and 64 an equivalent single winding, and by connecting jumper 112 across junctions 82 and 74 when windings 66 and 58 could be an equivalent single winding, and windings 60 and 52 an equivalent single winding, in this case the starting windings 58–66, and 52–60 would be adapted to have the current out of phase with the main winding by having a different resistance. In this example jumper 87 and jumper 113 would be in parallel and either could be used, eliminating the other.

It is important to note that when adjustable jumpers 36 and 37 are positioned at intermediate points on windings 54 and 62, and windings 56 and 64 that there are two portions on each that are in parallel. The portion of winding 54 between jumper 36 and junction 68 is in parallel with the portion of winding 62 between jumper 36 and junction 76, and likewise the portion of winding 56 between jumper 37 and junction 72 is in parallel with the portion of winding 64 between jumper 37 and junction 80. These parallel connected windings can be replaced by an equivalent single winding, or considered to be an equivalent single winding, each forming one leg of a Y connection, having a different phase relation in each leg of the Y connection. These two Y connections consist of a one Y connection comprising a first section, a second section and a third section. The said first section includes the part of winding 54 between jumper 36 and junction 70, the second section includes the part of winding 62 between jumper 36 and junction 78, and the third section includes the said parallel connected portions between jumper 36, on windings 54 and 62, and junctions 68 and 76 respectively. Another Y connection comprises a similar first, second and third section. The said first section of the said another Y connection includes the part of winding 56 between jumper 37 and junction 70, the second section includes the part of winding 64 between jumper 37 and junction 78, and the third section includes the said parallel connected portions between jumper 37, on windings 56 and 64, and junctions 72 and 80 respectively.

Adjustable jumpers 36 and 37 can be arranged to provide an adjustable torque motor by having the jumpers contact taps on the windings at predetermined points, and by switching or other means provide a variety of starting characteristics. Likewise jumpers 112 and 113 can be a switching means or other means to provide a variety of starting characteristics.

Since motor 100 starts and runs as a 2 pole motor and runs as a 4 pole motor, this invention can be adapted to operate as a two speed motor with a variety of running characteristics to favor either speed.

It is anticipated that the stator winding can be on the rotatable member and the rotor winding on the stationary member and either can be positioned internal relative to the other.

It is now apparent that there has been provided a novel motor construction which fulfills all of the objects and advantages sought therefor. Furthermore, this invention is intended to cover all changes, alterations and modifications of the examples of the invention herein chosen for purposes of disclosure, which do not constitute departures from the spirit and scope of the invention, and all such changes, alterations and modifications which will be readily apparent to one skilled in the art are contemplated as being within the scope of the present invention which is limited only by the claims which follow.

What I claim is:

1. A single phase, adjustable torque, leakage reactance split phase A.C. motor comprising a stator having a stator winding thereon and a rotor having a rotor winding thereon, one of said windings having a plurality of primary winding portions mutually inductively coupled to a plurality of secondary winding portions, said primary and secondary winding portions arranged in coupled pairs, said pairs of windings to be tapped at predetermined points and arranged so that means is provided to connect selected taps on a pair of said primary and secondary portions together to place a portion of the said primary in parallel with a portion of said secondary portion to provide adjustable torque and current under starting conditions, and a plurality of starting winding portions positioned at a space angle relative to said primary and secondary portions, a speed responsive switch device movable between a starting position at speeds below a predetermined speed to a running position at speeds above a predetermined speed, said switch device comprising not more than two movable switch blades and traversing not more than two stationary contacts, said switch device adapted to have an inoperative position whereby the said motor windings are de-energized, means including the starting position of said switch means connecting at least two of said primary winding portions in parallel across an A.C. source of energy, and connecting at least two of the said secondary winding portions in parallel and in a closed circuit with at least two of said starting winding portions also connected in parallel, starting torque is developed by means of the transformer action and associated leakage reactance thereof between the said primary winding portion and secondary winding portion, said winding portions to have a predetermined one distribution to provide one flux density, means including the running position of said switch device connecting said windings in a series parallel arrangement across said A.C. source to provide a full composite running winding, and connecting said winding portions to provide another winding distribution and another flux density.

2. The motor defined in claim 1 wherein said one flux density and said another flux density be approximately in the ratio of 1 to 1.

3. A single phase, leakage reactance split-phase A.C. motor comprising a stator having a stator winding thereon and a rotor having a rotor winding thereon, one of said windings having two sets of four separate symmetrically positioned winding portions, said two sets to be arranged to provide four mutually inductively coupled pairs of windings, each of said pairs to comprise at least one pole winding group, and all of said four portions of each set to be permanently connected in series to form two separate closed loop circuits, each having four junctions positioned between each of the said four winding portions of each set, switch means movable between a starting position and a running position, means including the starting position of said switch means connecting an A.C. source of energy to selected ones of said junctions of a first closed loop circuit so that two of the said four winding portions are in space quadrature to the other two of said four winding portions and connected so that the said two of the said four winding portions acting as a primary winding is connected across said A.C. source, a second closed loop circuit is connected by means to selected junctions of said first closed loop circuit so that two of the said four winding portions of the said second closed loop circuit are mutually inductively coupled to the said two primary windings of said first closed loop circuit and acting as a secondary winding, and the said two of the said four winding portions of the said second closed loop circuit are connected in space quadrature to the other two of said four winding portions of the said second closed loop circuit, and means connecting said secondary windings in a closed circuit with the other two of said four winding portions of at least one of the said closed loop circuits and acting as a starting winding, the said primary windings of the said first closed loop circuit and the said secondary windings of the said second closed loop circuit are connected together by means at one end and at one intermediate point on each to form a parallel connection of a part of each primary winding and associated secondary winding, phase shifting means between the said primary windings and said starting windings to be provided in part by transformer action and associated leakage reactance between the said primary and said secondary windings, and in part by the resistance and inductance of the windings, and means including the running position of said switch means connecting said two closed loop circuits at selected junctions across said A.C. source to provide a full composite running winding by connecting all of the said winding portions in a series-parallel arrangement.

4. A single phase, leakage reactance split-phase A.C. motor comprising a stator having a stator winding thereon and rotor having a rotor winding thereon, one of said windings having two sets of four separate symmetrically positioned winding portions, said two sets to be arranged to provide four mutually inductively coupled pairs of windings, each of said pairs to comprise at least one pole winding group, and all of said four portions of each set to be permanently connected in series to form two separate closed loop circuits, each having four junctions positioned between each of the said four winding portions of each set, switch means movable between a starting position and a running position, means including the starting position of said switch means connecting an A.C. source of energy to selected ones of said junctions of a first closed loop circuit so that two of the said four winding portions are in space quadrature to the other two of said four winding portions and connected so that the said two of the said four winding portions acting as a primary winding is connected across said A.C. source, a second closed loop circuit is connected by means to selected junctions of said first closed loop circuit so that two of the said four winding portions of the said second closed loop circuit are mutually inductively coupled to the said two primary windings of said first closed loop circuit and acting as a secondary winding, and the said two of the said four winding portions of the said second closed loop circuit are connected in space quadrature to the other two of said four winding portions of the said second closed loop circuit, and means connecting said secondary windings in a closed circuit with the other two of said four winding portions of at least one of the said closed loop circuits and acting as a starting winding, at least one of the said primary windings of the said first closed loop circuit and the associated said secondary winding of the said second closed loop circuit are connected together by means at one end and at one intermediate point forming a parallel connection of a part of the said primary winding and a part of the said secondary winding, phase shifting means between the said primary windings and said starting windings to be provided in part by transformer action and associated leakage reactance between the said primary and said secondary windings, and in part by the resistance and inductance of the windings, and means including the running position of said switch means connecting said two closed loop circuits at selected junctions across said A.C. source to provide a full composite running winding by connecting all of the said winding portions in a series-parallel arrangement.

References Cited in the file of this patent
UNITED STATES PATENTS 3,068,389    Cantonwine _____ Dec. 11, 1962